(12) United States Patent
Subbaian et al.

(10) Patent No.: US 9,973,654 B1
(45) Date of Patent: May 15, 2018

(54) METHODS AND DEVICES FOR ENHANCING EDGES OF A GRAPHIC OBJECT

(71) Applicant: XEROX CORPORATION, Norwalk, CT (US)

(72) Inventors: Sudhagar Subbaian, Coimbatore (IN); Sainarayanan Gopalakrishnan, Chennai (IN); Dhevendra Alagan Palanivel, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days. days.

(21) Appl. No.: 15/478,262

(22) Filed: Apr. 4, 2017

(51) Int. Cl.
*G06T 5/00* (2006.01)
*H04N 1/407* (2006.01)
*H04N 1/409* (2006.01)

(52) U.S. Cl.
CPC ... *H04N 1/4092* (2013.01); *H04N 2201/0094* (2013.01)

(58) Field of Classification Search
CPC .................. H04N 1/4092; H04N 2201/0094
See application file for complete search history.

(56) References Cited

U.S. PATENT DOCUMENTS

| 5,212,741 A | 5/1993 | Barski et al. |
| 5,852,678 A | 12/1998 | Shiau et al. |
| 2010/0259795 A1* | 10/2010 | Loce ............... G06K 9/44 358/3.27 |
| 2013/0265615 A1* | 10/2013 | Nakashima ............ H04N 1/58 358/3.27 |

FOREIGN PATENT DOCUMENTS

EP           0810774 A2    12/1997

* cited by examiner

*Primary Examiner* — Quang N Vo (57) ABSTRACT

The present disclosure discloses methods and systems (a multi-function device or a digital printer) having capabilities for an object enhancement. In an example, the MFD includes a digital front end module to detect edge of the object and direction of the edge. Following the detection of the edge, the digital front end module classify the pixels of the edge into two categories, for example, which define that whether the edge pixels are created by black-to-white transition or white-to-black transition. Based on the classification of the edge pixels, the digital front end module performs the object enhancement either in black-to-white transition or in white-to-black transition.

33 Claims, 8 Drawing Sheets

METHODS AND DEVICES FOR ENHANCING EDGES OF A GRAPHIC OBJECT

TECHNICAL FIELD

The present disclosure generally relates to the field of multi-function devices, specifically to methods and systems for enhancing image quality.

BACKGROUND

Text, graphic, or line images are often replicated or transmitted by a variety of techniques, such as photocopying, facsimile transmission, and scanning of such images into a memory device. The process of replication or transmission often tends to degrade quality of resulting image due to a variety of factors. Degraded images are characterized by indistinct or shifted edges, blended or otherwise connected characters, and distorted shapes.

A reproduced or transmitted image that is degraded in quality may be unusable in certain applications. For example, if the reproduced or transmitted image is to be used in conjunction with a character recognition apparatus, the indistinct edges and/or connected characters may preclude accurate or successful recognition of text or characters in the image. Also, if the degraded image is printed or otherwise rendered visible, the image may be more difficult to read and less visually distinct.

Various efforts have been made in the past for improving image quality. One such effort involve resolution enhancement algorithm which provides template matching. Template matching attempts to match a line, curve pattern, or linear pattern; and then tries to find the best way to reconstruct it within the available printing resolution.

Shiau et al., U.S. Pat. No. 5,852,678 and related European Patent Application No. EP0810774, disclose method and apparatus that improve digital reproduction of a compound document image containing half-tone tint regions and text and/or graphics embedded within the half-tone tint regions. The method entails determining a local average pixel value for each pixel in the image, then discriminating and classifying based on the local average pixel values, text/graphics pixels from half-tone tint pixels. Discrimination can be effected by calculating a range of local averages within a neighborhood surrounding each pixel; by calculating edge gradients based on the local average pixel values; or by approximating second derivatives of the local average pixel values based on the local averages. Text/graphics pixels are rendered using a rendering method appropriate for that type of pixel. That is, half-tone tint pixels are rendered using a rendering method appropriate for that type of pixel.

Barski et al., U.S. Pat. No. 5,212,741, discloses method and apparatus for processing image data of dot-matrix/ink-jet printed text to perform Optical Character Recognition (OCR) of such image data. In the disclosed method and apparatus, the image data is viewed for detecting if dot-matrix/ink-jet printed text is present. Any detected dot-matrix/ink-jet produced text is then pre-processed by determining the image characteristic thereof by forming a histogram of pixel density values in the image data. A two-dimensional spatial averaging operation as a second pre-processing step smoothes the dots of the texts into strokes and reduces the dynamic range of the image data. The resultant spatially averaged image data is then contrast stretched in a third pre-processing step to darken dark regions of the image data and lighten light regions of the image data. Edge enhancement is then applied to the contrast stretched image data in a fourth pre-processing step to bring out higher frequency line details. The edge enhanced image data is then binarized and applied to a dot-matrix/ink jet neural network classifier for recognizing characters in the binarized image data from a predetermined set of symbols prior to OCR.

The above cited approaches generally teach global techniques aimed at intelligent binarization, OCR, and document image analysis. They do not teach nor suggest local image quality enhancement of text, graphic, or line art. With local image quality enhancement, a skilled person may understand the application of image quality enhancement technique on a particular user-selected image. Hence, there is a need to have an image quality enhancement technique that can detect and enhance text, graphic, or and line art in a given document image.

SUMMARY

According to aspects illustrated herein, a method for enhancing an object present in an input image is disclosed. The method includes receiving a print job comprising an input image. Upon receipt, the input image is converted into a digital bitmap image comprised of an array of pixels, where each pixel being assigned with a pixel value representing printing information. Based on the pixel value, edge pixels of the object present in the input image are detected. Then, enhancement of the edge pixels of the object present in the input image, is performed. In order to perform enhancement, for each and every detected edge pixel, a window is formed around the edge pixel with a height and a width of predefined pixels, and a sum of active pixels in columns and a sum of active pixels in rows of the window is calculated. Based on the calculation, direction of edge of the object present in the window is determined, and it is determined whether the edge pixel is formed due to black-to-white transition or white-to-black transition. Thereafter, based on both determinations, direction and transition determinations, the enhancement on the edge pixel in the window is performed. Thereafter, an output image is generated based on the enhancement performed on the edge pixels of the object, and the output image is printed.

According to aspects illustrated herein, a digital printer for enhancing an object present in an input image is disclosed. The digital printer includes a processor, a digital front end (DFE) module coupled to the processor, and a digital rear end (DRE) module coupled to the processor. The DFE module receives a print job including an input image. Upon receipt, the input image is converted into a digital bitmap image comprised of an array of pixels, where each pixel being assigned with a pixel value representing printing information. Based on the pixel value, the DFE module detects edge pixels of the object present in the input image. Then, enhancement of the edge pixels of the object is performed. In one example, in order to perform enhancement, for each and every detected edge pixel, the DFE module forms a window around the edge pixel with a height and a width of predefined pixels, and then calculates a sum of active pixels in columns and a sum of active pixels in rows of the window. Based on the calculation, the DFE module determines direction of edge of the object present in the window, and determines whether the edge pixel is formed due to black-to-white transition or white-to-black transition. Then, based on both determinations, direction and transition determinations, the DFE module performs the enhancement on the edge pixel in the window. Once the enhancement is performed, the DRE module generates an output image based on the enhancement performed on the edge pixels of the object, and prints the output image at the digital printer.

According to aspects illustrated herein, a non-transitory computer-readable medium implementing the subject matter may include instructions executable by a processing resource. The instructions are executed to receive a print job at a digital printer. The print job includes an input image. Upon receipt, the input image is converted into a digital bitmap image comprised of an array of pixels, where each pixel being assigned with pixel value representing printing information. Based on the pixel value, edge pixels are detected for an object present in the input image. Then, enhancement of the edge pixels of the object is performed. In one example, in order to perform enhancement, for each and every detected edge pixel, a window is formed around the edge pixel with a height and a width of predefined pixels. Then, a sum of active pixels in columns and a sum of active pixels in rows are calculated for the window. Based on the calculation, a determination is made for direction of edge of the object present in the window;] and a determination is made as to whether the edge pixel is formed due to black-to-white transition or white-to-black transition. Then, based on both determinations, direction and transition determinations, the enhancement is performed on the edge pixel in the window. Once the enhancement is performed, an output image is generated based on the enhancement performed on the edge pixels of the object, and is printed at the digital printer.

Other and further aspects and features of the present subject matter will be evident from the following detailed description of the exemplary implementations, which are intended to illustrate, not limit, the present subject matter.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few aspects of the present subject matter are explained in detail below with reference to the various figures. Example implementations are described to illustrate the disclosed subject matter, not to limit its scope, which is defined by the claims. Those of ordinary skill in the art will recognize a number of equivalent variations of the various features provided in the description that follows.

Non-Limiting Definitions

In the disclosure herein after, one or more terms are used to describe various aspects of the present subject matter. For better understanding of the subject matter, a few definitions are provided herein for better understating of the present disclosure.

"Input image" refers to a pattern of physical light captured or generated at a user device including workstations, personal computers, personal digital assistants (PDAs), laptop computers, notebooks, smart phones, and the like. The input image may include fill objects such as characters, words, text, and other objects such as graphics, photos, etc. The input image may be included in a set of one or more input images, such as in input images of the pages of a document. The input image may be divided into segments, objects, or structures, each of which is itself an image. A segment, object, or structure of the input image may be of any size up to and including the whole input image.

"Printing system or print server" is defined as including, but not necessarily limited to, a computing device, program, or combination thereof that processes requests, delivers data or other information, or provides one or more services over the cloud and/or a local network.

"Client device or user device" is defined as including, but not necessarily limited to, hardware, software, or a combination thereof that accesses a server. Examples include, but are not limited to, a computing device, a phone, a tablet, a personal digital assistant, or a server.

The term "printer" or "digital printer" may be defined as including, but not necessarily limited to, a peripheral that produces a representation of a document on one or both sides of media such as paper, transparency, fabric, etc. The printer can be single function device or multi-function (e.g., including scanning, faxing, or other functionality) device. The multi-function device may include software, hardware, firmware, or combination thereof. Further, the printer can use any of a variety of different types of marking technologies such as laser, inkjet, dye-sublimation, off-set printing, thermal printing, impact, etc. As used herein, the terms "render" and "rendering" are defined as including, but not necessarily limited to, taking print data such as text, images, graphics, etc., and converting them into a ready to print (RTP) format that is compatible with a destination printer. In place of a printer, the disclosure may include a multi-function device offering a number of functionalities of which one functionality is printing. Other than printing, the multi-function device includes scanning, copying, faxing, imaging or the like as mentioned above. The printer may interchangeably be used with a digital printer or a multi-function device.

"Image enhancement" or simply "Enhancement" refers to a process of improving the quality of a digitally stored image by manipulating the image with software. In the computer graphics, the enhancement can be implemented, for example, to make an image lighter or darker, or to increase or decrease contrast. Further, advanced image enhancement software also supports many filters for altering images in various ways. Programs specialized for image enhancements are sometimes called "image editors." The image quality enhancement is performed on images as selected by the user.

"Computer-readable medium" or "storage medium" refers to a physical medium that can store data. Examples of "computer-readable medium" may include magnetic medium such as diskettes, floppy disks, and tape; optical medium such as laser disks and CD-ROMs; and semiconductor medium such as semiconductor ROMs and RAMs. As used herein, "storage medium" covers one or more distinct units of a medium that together store a body of data. For example, a set of floppy disks storing a single body of data would together be storage medium.

Overview

Generally, a blurring of scanned text/line due to scanner resolution limitations tends to reduce observable local contrast and hence detection accuracy, especially in the case of thin text/line. This situation presents an issue that requires explicit treatment in the algorithm or technique discussed below.

Image quality enhancement technique disclosed herein (also referred to interchangeably herein as an enhancement algorithm) is based on the observation that text, graphic, or lines have very high contrast in return to the background. Therefore, a region is labeled text or graphic or line if, in that region, very strong contrast in the form of relatively sharp edges is observed, and provided that the dark side is also close to being neutral in color, i.e., the color saturation is small. The image quality enhancement technique described herein is therefore applicable to any of black text/graphic/line on white background, black text/graphic/line on color background, and white or light text/graphic/line on dark background (reverse text/graphic/line).

Various method(s) and system(s) of the present subject matter described herein facilitates the image quality enhancement technique for enhancing text, graphic, or line art present in an input image received at a multifunctional device (MFD). In one implementation, the MFD can be a digital printer and includes a digital front end (DFE) module to detect edge of the text, graphic, or line art present in the input image and to detect direction of the edge in the input image. Based on the detection of the direction of the edge, the DFE module is able to perform enhancement for text, graphic, or line art in either horizontal direction or vertical direction. For example, in case the DFE module detects that the direction of the edge is in vertical direction, then the DFE module performs enhancement in horizontal direction, and vice versa.

Following the detection of the edge, the DFE module may further classify the pixels of the edge into two categories, for example, which define that whether the edge pixels are created by black-to-white transition or by white-to-black transition. Based on such classification of the edge pixels, the DFE module performs enhancement for text, graphic, or line art either in black-to-white transition or in white-to-black transition.

Thus, with the implementation of the present subject matter, the image quality enhancement technique described herein can easily detect and enhance the text, graphic, or line art present in the input image.

Exemplary Implementations

The following disclosure explains a mechanism where a printing system or a server, with some hardware and software enhancements, is enabled to facilitate a user of a user device (or client device) to perform image quality enhancement of text, graphic, or line art present in a given input image. Such printing system is further described with reference to FIGS. 1-7.

It should be noted that the description and the figures merely illustrate the principles of the present subject matter along with examples described herein, and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present subject matter, as well as specific examples thereof, are intended to encompass equivalents thereof.

The present disclosure discloses methods and systems that allow the user to select one or more images for image quality enhancement.

Figure 1:
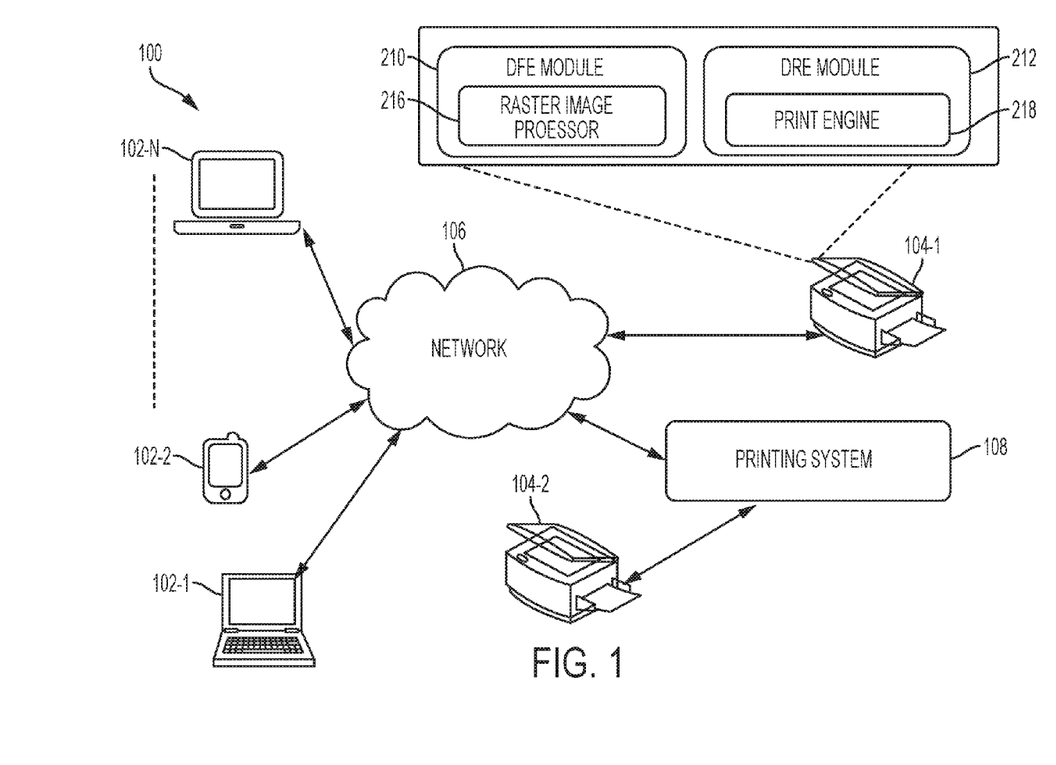
FIG. 1 illustrates a schematic network printing environment for network printing, according to an example.

FIG. 1 illustrates, as an example, a printing environment 100 for printing of electronic documents, according to an example of the present subject matter. The printing environment 100 includes a plurality of user devices 102-1, 102-2, 102-N, hereinafter collectively referred to as user devices 102 and individually as user device 102. Examples of the user devices 102 may include, but are not limited to, workstations, personal computers, personal digital assistants (PDAs), laptop computers, notebooks, smart phones, smart cameras, smart television sets, and other smart devices.

The printing environment 100 includes a plurality of printers, out of which two printers 104-1 and 104-2 are shown for the sake of simplicity. The two printers 104-1 and 104-2 are hereinafter collectively referred to as printers 104 and individually as a printer 104. The printer 104 can be single function device or a multi-function device. The multi-function device may include software, hardware, firmware, or combination thereof.

In an example, the printers 104 and the user devices 102 are connected directly over a network 106 or through a printing system 108 over the network 106. In an example, the printing system 108 may be a print server, a network server, a web server, or a data server. The network 106 may be a single network or a combination of multiple networks. The network 106 may include one or more area networks, such as a local area network (LAN), a wide area network (WAN), an intranet, the internet, or any other type of network. In an example, the network 106 may include mobile communication network, for example, 2G, 3G or 4G mobile communication network.

In an example, a user of the user device 102-2 logs in to a printing service. The printing service can be offered directly by the printer 104-1 or the printing system 108 coupled to the printer 104-2. The user can login from the user device 102-2 present anywhere in the network 106, for submission of a print job to the printing service. Further, for submission of the print job, the user device 102-2 can facilitate the user to access a (web) portal of the printing service. In an example, the user may access the portal by selecting a print command for printing an input image. In another example, the user may access the portal by directly entering a URL address of the portal in a (web) browser. In yet another example, the user may access the portal using other (web) elements, such as widgets, and web enabled applications. Further, the portal may present a user interface, such as a print dialogue box, or a graphical user interface (GUI). The user interface allows the user to provide various print options including, but not limited to, an option of selecting a quality enhancement for text, graphic, or line art present in the input image.

For the printing service, the print job from the user device 102-2 is received either by the printing system 108 or the printer 104-1, based on the user's selection. The print job is received in the form of a page description language (PDL) file such as PostScript (PS), Portable Document Format (PDF) and Extensible Markup Language (XML) Paper Specification (XPS). The PDL file may include information about various objects, say, characters, words, text, graphics, photos, and the like, contained in the input image present in the PDL file. The information may describe the appearance of the objects present within the input image, and may include a set of programming language commands for processing the input image based on the information. In one example, based on the set of programming language commands or specifications present in the PDL file, the input image may be processed.

Based on the commands and information stored in the PDL file, the printer 104 or the printing system 108 decomposes the PDL file for determining whether the user has selected the option of quality enhancement of text, graphic, or line art present in the input image. In case it is determined that the text, graphic, or line art present in the input image is selected, the input image present in the PDL file is converted into a digital bitmap image comprised of an array of pixels. In an example, each pixel included in the digital bitmap image is assigned with object tag information and pixel value representing printing information. For example, the object tag information may determine or define an object type associated with a particular pixel. Examples of the object types may include text, graphics, or line art. Similarly, the pixel values are either 1 or 0 value. It should be noted that the pixel value of 0 represents an OFF state of corresponding pixel, while pixel value of 1 represents an ON or active state of corresponding pixel. However, in one example, after conversion from a digital input image to a digital bitmap image, the digital bitmap image may include pixels values ranging from 0 to 255, where each pixel value represents different color and light intensity.

Based on the pixel values, the printer 104 or the printing system 108 determines edge pixels of text, graphic, or line art present in the input image, interior pixels of text, graphic, or line art present within the input image, and background pixels of the input image. The edge pixels are also known as "stroke pixels." Similarly, the interior pixels are also known as "fill pixels" defining a fill region enclosed within the edge pixels of a particular graphic object.

Once the background pixels, the edge pixels, and the interior pixels are determined or defined for the object based on the associated tag information and the pixel values, the image quality enhancement technique disclosed herein performs quality enhancement on the edge pixels of the text, graphic, or line art present in the input image.

In one example, for each and every detected edge pixel, the image quality enhancement technique disclosed herein forms a window around the edge pixel with a height and a width of predefined pixels. Then, a sum of active pixels in columns and a sum of active pixels in rows are calculated for that window. In one example, the active pixels are pixels having 1 pixel value. Further, based on the calculation of the sums, a determination of direction of edge of the text, graphic, or line art present in the window is performed, followed by a determination of whether the edge pixel is formed due to black-to-white transition or white-to-black transition. Then, based on both the direction determination and transition determination, the enhancement is performed on the edge pixel present in the window. Once the enhancement is performed for all the edge pixels, an output image is generated based on the enhancement performed on the edge pixels of text, graphic, or line art, for printing at the printer 104-1 or 104-2.

Thus, with the implementation of the present subject, the image quality enhancement technique described herein can easily detect and enhance the text, graphic, or line art present in the input image.

Further, in an example, the working of the printing system 108 implemented in the printing environment 100, is described in more detail with reference to FIGS. 2, 3A-3G, 4A-4B, and 5A-5B.

Figure 2:
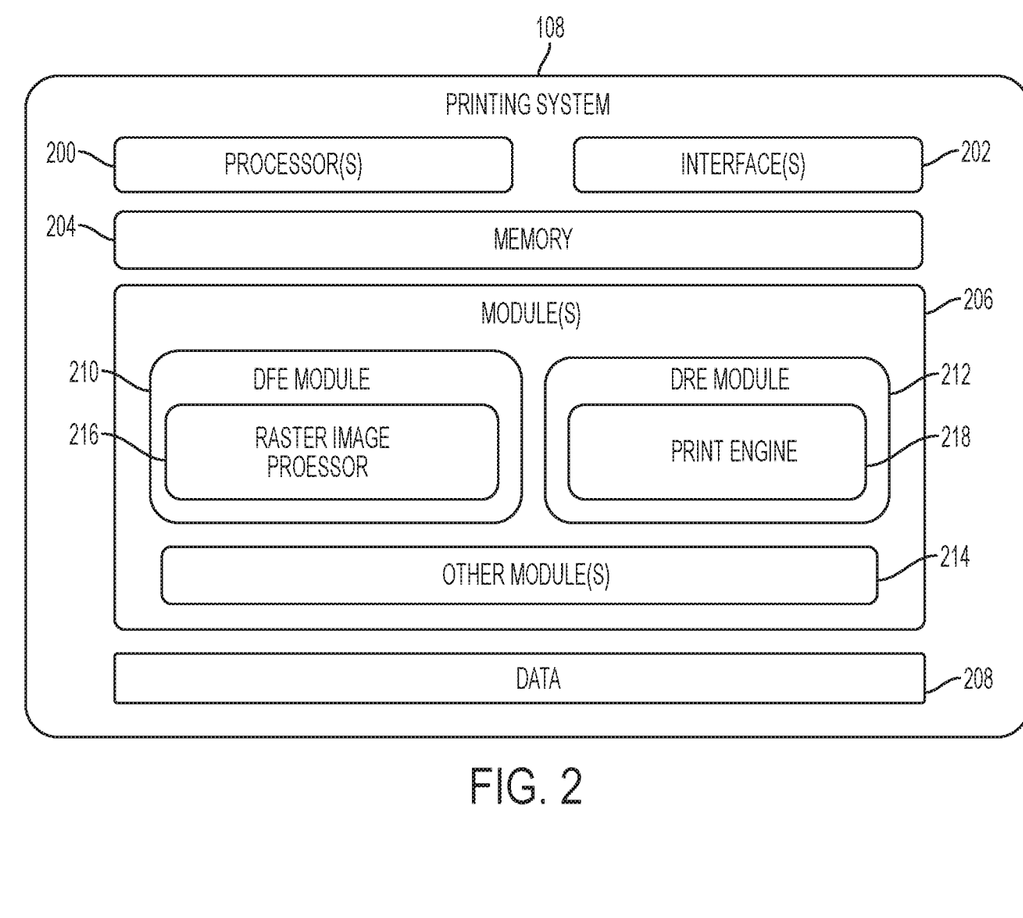
FIG. 2 illustrates a schematic of a printing system, according to an example.

FIG. 2 illustrates various components of the printing system 108, in accordance with one example of the present subject matter. The printing system 108 includes a processor 200, an interface 202, and a memory 204. Further, the printing system 108 includes module(s) 206 and data 208.

The processor 200, amongst other capabilities, may be configured to fetch and execute computer-readable instructions stored in the memory 204. The processor 200 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as processor (s), may be provided through the use of dedicated hardware as well as hardware capable of executing software in association with appropriate software.

When provided by the processor 200, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 202 may include a variety of machine readable instructions-based interfaces and hardware interfaces that allow the printing system 108 to interact with different entities, such as the processor 200, the module(s) 206, and the data 208. Further, the interface(s) 202 may enable the components of the printing system 108 to communicate with other computing systems, and external repositories. The interface 202 may facilitate multiple communications within a wide variety of networks and protocol types, including wireless networks, wireless Local Area Network (WLAN), RAN, satellite-based network, etc.

The memory 204 is coupled to the processor 200 and may, among other capabilities, provide data and instructions for generating different requests. The memory 204 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 206 may include routines, programs, objects, components, data structures, and the like, which perform particular tasks or implement particular abstract data types. The module(s) 206 may further include modules that supplement applications on printing system 108. Further, the module(s) 206 can be implemented in hardware, instructions executed by the processor 200, or by a combination thereof.

In one example, the module(s) 206 may be machine-readable instructions (software) which, when executed by a processor/processing unit, perform any of the described functionalities. The machine-readable instructions may be stored on an electronic memory device, hard disk, optical disk, or other machine-readable storage medium, or non-transitory medium. In one further example, the machine-readable instructions can also be downloaded to the storage medium via a network connection.

The module(s) 206 may perform different functionalities which may include, but may not be limited to, receiving a print job including an input image from the user device 102-2; converting the input image into a digital bitmap image comprised of an array of pixels, where each pixel being assigned with a pixel value representing a printing information; based on the pixel value, detecting edge pixels of a text, graphic, or line art present in the input image; performing the enhancement on the edge pixels of the text, graphic, or line art present in the input image; and generating an output image of the enhanced edge pixels for printing the output image at the printer 104.

In one example implementation, the module(s) 206 includes a digital front end (DFE) module 210, a digital rear end (DRE) module 212, and other module(s) 214. In one example, the DFE module 210 includes a raster image processor (RIP) 216, and the DRE module 212 includes a print engine 218.

Further, the data 208 serves, amongst other things, as a repository for storing data that may be fetched, processed, received, or generated by one or more of the module(s) 206. The data 208 may include intermediate processing data related to image processing.

In operation, the DFE module 210 of the printing system 108 receives the incoming print jobs in the form of page description language (PDL) file such as PostScript (PS), Portable Document Format (PDF) and Extensible Markup Language (XML) Paper Specification (XPS). The PDL file may include information about various objects, say, characters, words, text, graphics, photos, line, and the like, contained in the input image present in the PDL file. The information may describe the appearance of the objects present within the input image, and may include a set of programming language commands for processing the input image based on the information. In one example, based on the set of programming language commands or specifications present in the PDL file, the input image may be processed.

Further, based on the commands and information present in the PDL file, the DFE module 210 decomposes the PDL file to determine whether any text, graphic, or line art present in the input image is selected by the user for performing image enhancement. In an example, in case it is determined that the quality enhancement option has been selected by the user for the text, graphic, or line art present in the input image, the DFE module 210 initiates the quality enhancement technique described herein for the text, graphic, or line art present in the input image in accordance with the implementations of the present subject matter. In one example implementation, as shown in FIGS. 3A-3D, the image quality enhancement technique involves an enhancement algorithm provided below:

Step 1: Read contone image, wherein the contone image (input image) can be "IN," final result of image enhancement of contone image can be "out," and i, j are variables representing the row index, the column index, respectively, in the contone image (input image).

Step 2: Find edge pixels of text, graphic, or line art present in the contone image (input image), wherein "ED" can be an edge pixel located in central location in FIGS. 3A-3D.

Step 3: Form a window around the edge pixel ED with height and width of "9" pixels, wherein "K" representing the window FIGS. 3A-3D.

FIGS. 3A-3D illustrate 9×9 window (K) formed around the edge pixel (ED).

Step 4: Split the 9×9 window K into nine 3×3 kernels including A, B, C, D, E, F, G and H.

Step 5: Find the Sum_Col and Sum_Row from the edge pixel ED to find the enhancement direction.

Figure 3A:
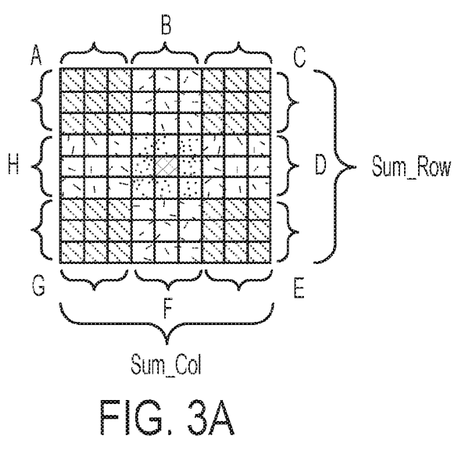
FIGS. 3A-3G illustrate an example operation of image quality enhancement technique implemented in accordance with the present subject matter.
Figure 3B:
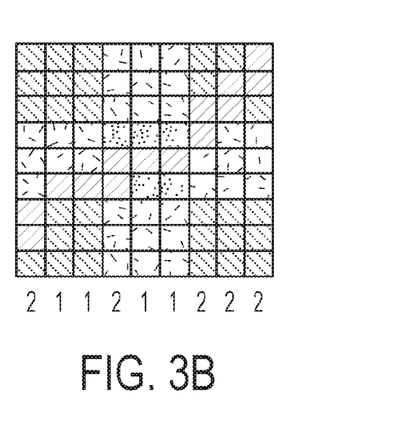

For example, as shown in FIG. 3B,
considering Sum_Col=2 1 1 2 1 1 2 2 2,
Sum_Col>0=1 1 1 1 1 1 1 1 1,
Sum_Col<3=1 1 1 1 1 1 1 1 1,
Sum_Col>0 & Sum_Col<3=1 1 1 1 1 1 1 1 1,
then, Sum(Sum_Col>0 & Sum_Col<3)=9

Figure 3C:
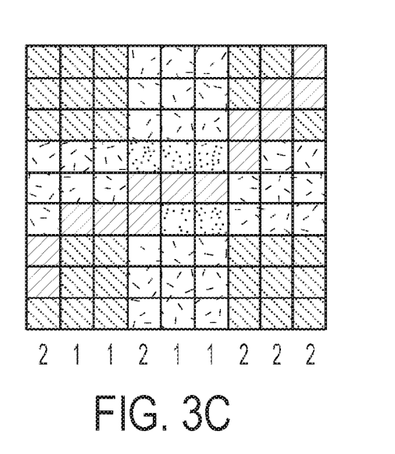
Figure 3D:
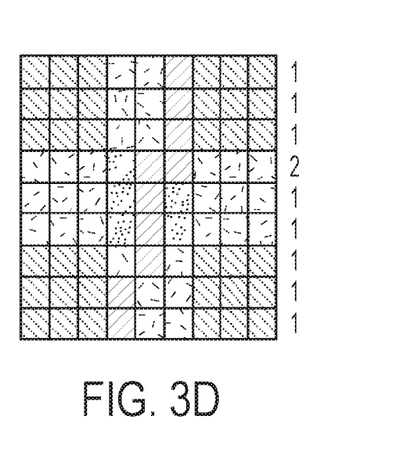
Figure 3E:
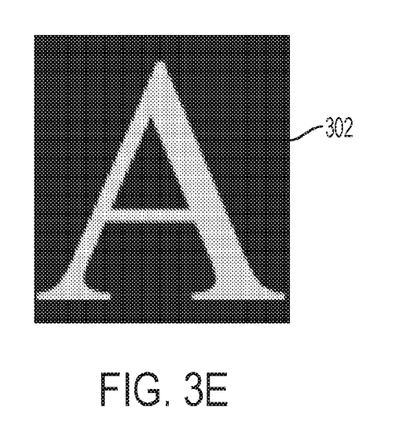
Figure 3F:
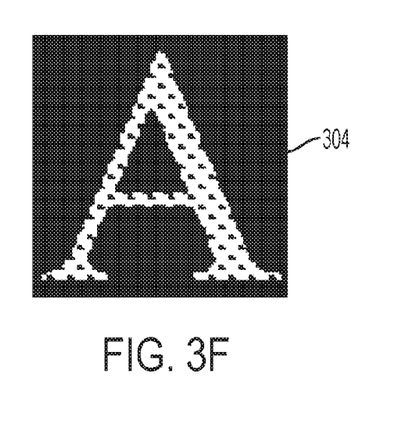
Figure 3G:
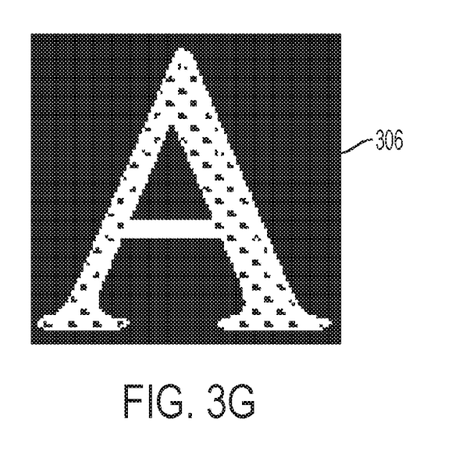
Figure 4A:
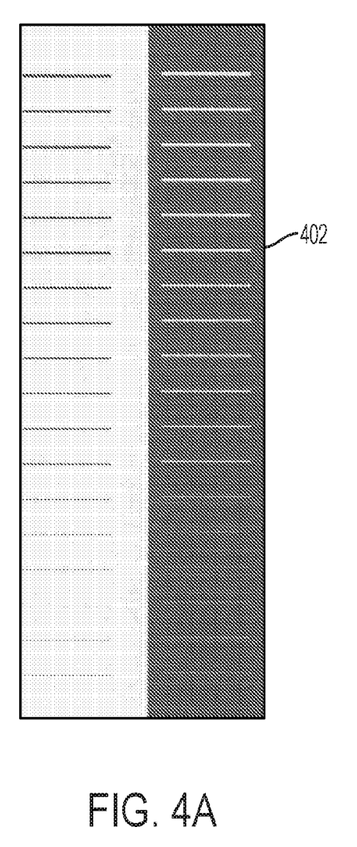
FIGS. 4A-4B illustrate an example operation of image quality enhancement technique implemented in accordance with the present subject matter.
Figure 4B:
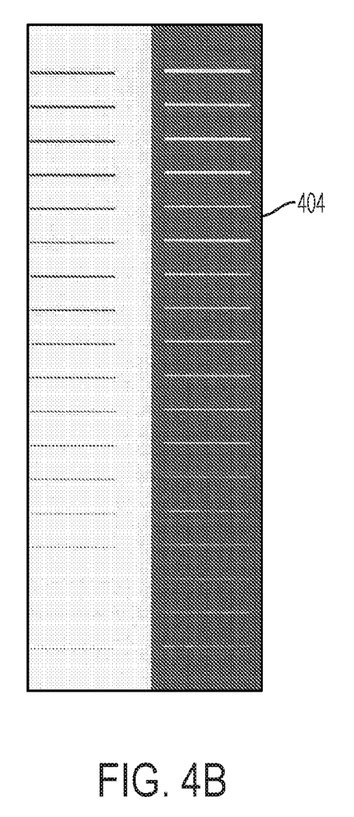
Figure 5A:
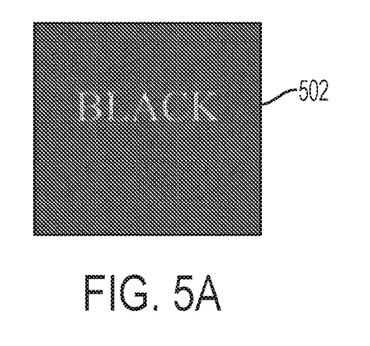
FIGS. 5A-5B illustrate an example operation of image quality enhancement technique implemented in accordance with the present subject matter.
Figure 5B:
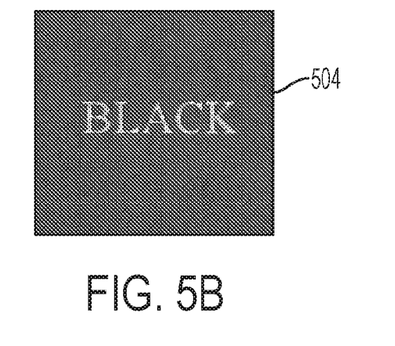

Step 6: If Sum(Sum_Col>0 & Sum_Col<3)>7, then enhancement is required in vertical direction
else, if Sum(Sum_Row>0 & Sum_Row<3)>7, then enhancement is required in horizontal direction Step 7: for vertical direction enhancement, as shown in FIG. 3C,
if sum(sum(B>0))>4 wherein B is the sum of column pixels in the vertical direction, then edge is due to white to black transition
out(i−3,j)=1
out(i,j)=1
else, the edge is due to black to white transition
out(i,j)=0;
out(i:i+2,j)=1;

Step 8: for horizontal direction enhancement, as shown in FIG. 3D,
if sum(sum(H>0))>4% wherein H is the sum of row pixels in the horizontal direction, then edge is due to white to black transition
out(i,j:j+1)=1;
out(i,j−3)=1;
out(i,j)=1;
else, the edge is due to black to white transition
out(i,j+2)=0;
out(i,j)=1;

As per the algorithm, in Step 1, for performing the quality enhancement, the DFE module 210 actuates raster image processor (RIP) 216 read a contone or input image 302, 402, or 502 present in the PDL file (FIG. 3E, FIG. 4A, FIG. 5A). In one example, the contone image is a continuous tone image, such as a photograph, that is converted into a black-and-white image. The contone image is generally reproduced or generated by a variety of known techniques, such as photocopying, facsimile transmission, and scanning of such image. Once the contone or input image 302 is read by the RIP 216, the RIP 216 converts the input image 302, 402, or 502 into a digital bitmap image 304 (or halftone image) comprised of an array of pixels (FIG. 3F). In an example, each pixel comprised in the digital bitmap image 304 is assigned with pixel value representing printing information.

In Step 2, based on the pixel value of the printing information, the RIP 216 determines edge pixels of text, graphic, or line art present in the input image.

Edge pixels are also known as "stroke pixels." The edge pixels are defined as transition between a background and a foreground of the input image. That is, the edge pixels define the transition between background pixels and foreground pixels.

The background pixels are defined as pixels having relatively little or no printable information within. Printable information is a digital value or a pixel value assigned to a pixel which results in a certain color and amount of printing material, such as ink or toner, to be deposited on a printable medium, such as paper, where the color and amount of the printing material has a functional relationship to the pixel value. For example, a pixel value for a pixel may represent yellow color may mean that the ink or tonner of yellow color being deposited for that pixel, resulting in a visually yellow pixel.

The foreground pixels are defined as pixels having some printable information within. The foreground pixels may be either the edge pixels or interior pixels. The interior pixels are foreground pixels that are not the edge pixels. The interior pixels can be distinguished from the background pixels in that if a pixel is not an edge pixel (from above) and if in the input image the pixel value is a 0 (no printing information), then that pixel is a background pixel. Further, the interior pixels are generally enclosed or surrounded by the edge pixels to enclose an interior area of the text, graphic, or line present in the input image.

In Step 3, once the edge pixels are determined or defined, the RIP 216 forms, for each and every detected edge pixel, a window around the edge pixel with a height and a width of predefined pixels. In one example, the predefined pixels can be nine pixels. That is, the window is of 9×9 pixels size.

In Step 4, the RIP 216 splits the window into 9 kernels of size 3×3 pixels.

In Step 5, a sum of active pixels in columns and a sum of active pixels in rows are calculated for the window. In an example, the active pixels are pixels having 1 pixel value. Also, in one example, for calculating the sum of active pixels in columns and rows, sum of columns or rows is first calculated for each kernel and then for entire window.

In Step 6, based on the calculation of the sum of active pixels in columns in the window, the RIP 216 determines whether enhancement is required in vertical direction or not. For example, in case the sum of active pixels in columns of the window is more than a predefined threshold, then the RIP 216 determines that the enhancement is required in vertical direction. In one example, the predefined threshold can be 7.

Further, when the sum of active pixels in columns in the window is less than the predefined threshold, the RIP 216 compares the sum of active pixels in rows with the predefined threshold. In case the sum of active pixels in rows in the window is more than the predefined threshold, then the RIP 216 determines that the enhancement is required in horizontal direction; otherwise, the RIP 216 determines that no enhancement is required in vertical or horizontal direction.

In Step 7, in case the RIP 216 determines that the vertical direction enhancement is required, the RIP 216 then determines whether the edge pixel is formed due to black-to-white transition or white-to-black transition. Then, based on the transition determination, the RIP 216 performs vertical direction enhancement on the edge pixel present in the window.

In Step 8, in case the RIP 216 determines that the vertical direction enhancement is required, the RIP 216 then determines whether the edge pixel is formed due to black-to-white transition or white-to-black transition. Then, based on both the transition determination, the RIP 216 performs vertical direction enhancement on the edge pixel present in the window.

In Step 8, in case the RIP 216 determines that the horizontal direction enhancement is required, the RIP 216 then determines whether the edge pixel is formed due to black-to-white transition or white-to-black transition. Then, based on both the determination, the RIP 216 performs the horizontal direction enhancement on the edge pixel present in the window.

Thus, with the implementation of the present subject, the image quality enhancement technique described herein can easily detect and enhance the text, graphic, or line art present in the input image, and generates an output mage 306, 404, or 504 (FIG. 3G, FIG. 4B, and FIG. 5B, respectively) based on the enhancement performed on the edge pixels of text, graphic, or line art.

In the above description, although the operation of the present subject matter is described in relation to the printing system 108, but the description is equally applicable or operation-able by any multifunctional device connected to the network 106. The multifunctional device can include the printer 104-1. As can be seen in FIG. 1, the printer 104-1 can also include the necessary modules for implementation of the present subject matter. For example, the printer 104-1 may include the digital front end (DFE) module 210 having the raster image processor (RIP) 216 and a digital rear end (DRE) module 212 having the print engine 218.

Figure 6:
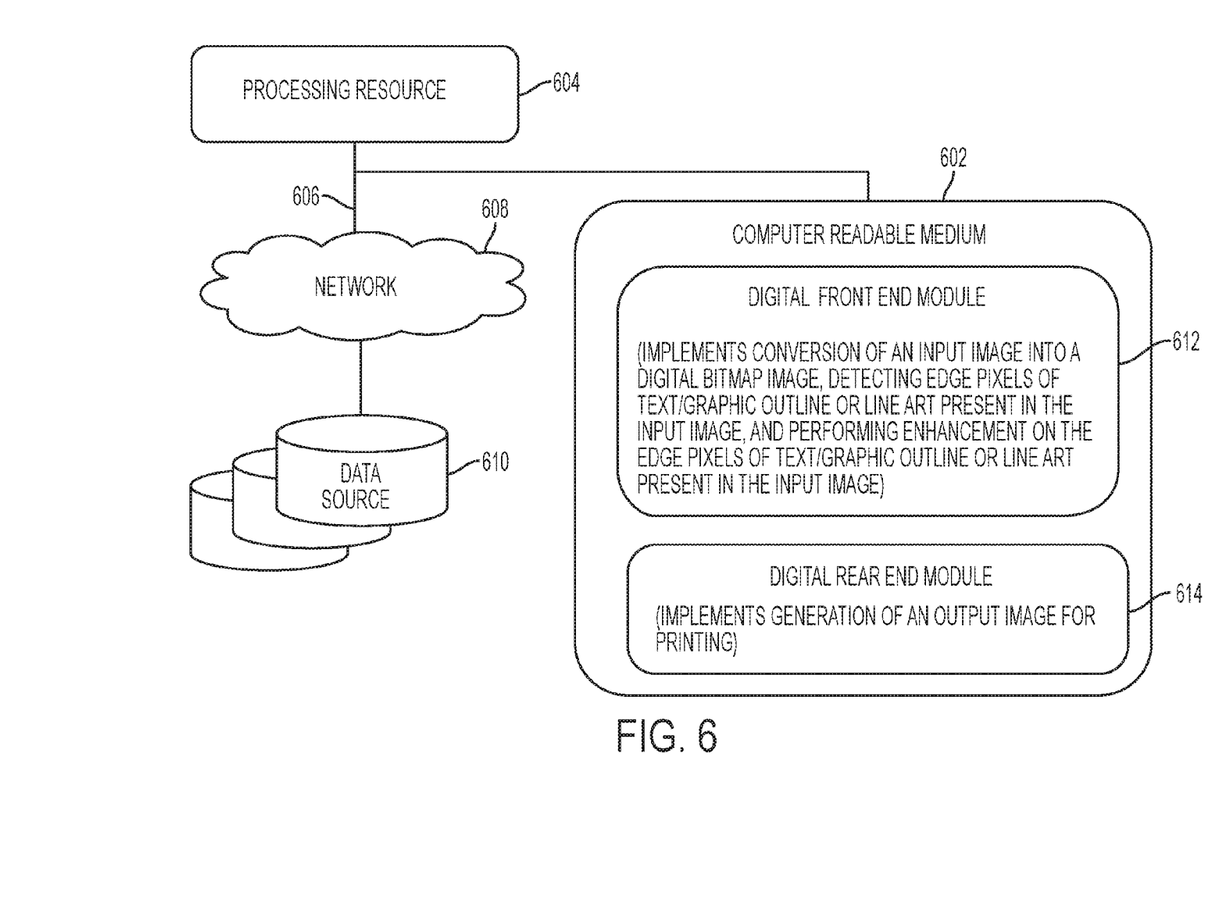
FIG. 6 illustrates a network environment for implementing the present subject matter, according to an example.

FIG. 6 illustrates an example computing environment 600 using a non-transitory computer readable medium 602 for implementing operation of the printing system 108 or the printer 104-1, according to an example of the present subject matter. The computing environment 600 may be a public computing environment or a private computing environment. In one example, the computing environment 600 includes a processing resource 604 communicatively coupled to the non-transitory computer readable medium 602 through a communication link 606.

For example, the processing resource 604 can be a processor, such as a control device of the printing system 108 or the printer 104-1. The non-transitory computer readable medium 602 can be, for example, an internal memory device or an external memory device. In one example, the communication link 606 may be a direct communication link, such as one formed through a memory read/write interface. In another example, the communication link 606 may be an indirect communication link, such as one formed through a network interface. In such a case, the processing resource 604 can access the non-transitory computer readable medium 602 through a network 608. The network 608 may be a single network or a combination of multiple networks and may use a variety of communication protocols.

The processing resource 604 and the non-transitory computer readable medium 602 may also be communicatively coupled to data sources 610 over the network 608. The data sources 610 can include, for example, databases and computing devices. The data sources 610 may be used by the database administrators and other users to communicate with the processing resource 604.

In one example, the non-transitory computer readable medium 602 can include a set of computer readable instructions, such as a digital front end (DFE) module 612 and a digital rear end (DRE) module 614. The set of computer readable instructions, referred to as instructions hereinafter, can be accessed by the processing resource 604 through the communication link 606 and subsequently executed to perform acts for network service insertion. In other words, during operation, the processing resource 604 can execute the DFE module 612 and DRE module 614.

On execution by the processing resource 604, the DFE module 612 receives a print job in the form of page description language (PDL) file. The PDL file may include information about various objects, say, characters, words, text, graphics, photos, line, and the like, contained in the input image present in the PDL file. The information may describe the appearance of the objects present within the input image, and may include a set of programming language commands for processing the input image based on the information. In one example, based on the set of programming language commands or specifications present in the PDL file, the input image may be processed.

Further, based on the commands and the information present in the PDL file, the DFE module 612 decomposes the PDL file to determine whether any text, graphic, or line art present in the input image is selected by the user for performing image enhancement. In case it is determined that the quality enhancement option has been selected by the user for the text, graphic, or line art present in the input image, the DFE module 612 converts the input image present in the PDL file into a digital bitmap image comprised of an array of pixels. In an example, each pixel comprised in the digital bitmap image is assigned with object tag information and pixel value.

Based on the object tag information and pixel value, the DFE module 612 determines boundary pixels, interior pixels, and edge pixels in the input image. Upon determination, the DFE module 612 performs quality enhancement on the edge pixels of the text, graphic, or line art present in the input image.

In one example, for each and every detected edge pixel, the DFE module 612 forms a window around the edge pixel with a height and a width of predefined pixels. Then, the DFE module 612 calculates a sum of active pixels in columns and a sum of active pixels in rows are calculated for that window. In one example, the active pixels are pixels having 1 pixel value. Further, based on the calculation of the sums, and then calculates a sum of active pixels in columns and a sum of active pixels in rows of the window. Based on the calculation, the DFE module 612 determines direction of edge of the text, graphic, or line art present in the window, and determines whether the edge pixel is formed due to black-to-white transition or white-to-black transition. Then, based on both the direction determination and transition determination, the DFE module 612 performs the enhancement on the edge pixel in the window.

Once the enhancement is performed for all the edge pixels, the DRE module 614 generates an output image based on the enhancement performed on the edge pixels of text, graphic, or line art, for printing at the printer 104-1 or 104-2. The printer 104-1 or 104-2 can be single function device or multi-function device. The multi-function device may include software, hardware, firmware, or combination thereof.

Thus, with the implementation of the present subject, the image quality enhancement technique described herein can easily detect and enhance the text, graphic, or line art present in the input image.

Figure 7:
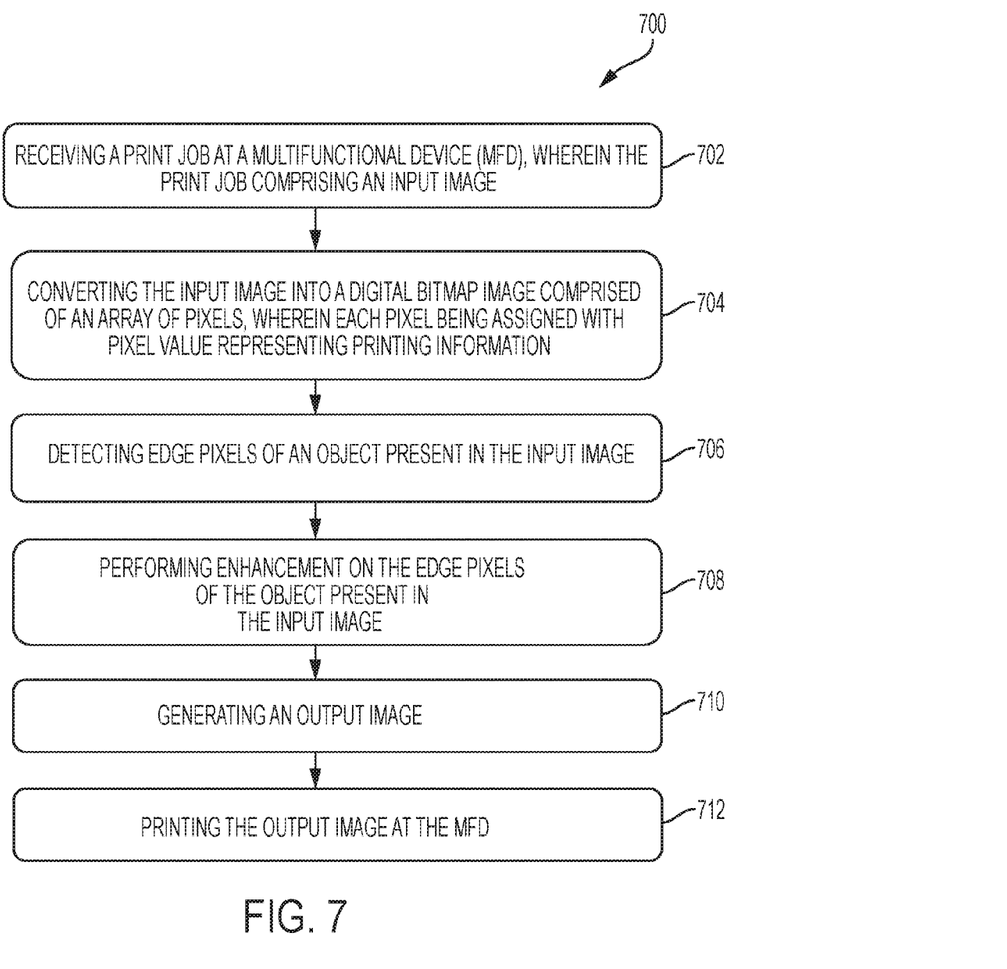
FIG. 7 illustrates a method for operating a multifunctional device, according to an example.

Method 700 is described in FIG. 7 for operating a multifunctional device (MFD) such as the printer 104-1, according to an example of the present subject matter. The order in which the method 700 is described is not intended to be construed as a limitation, and any number of the described method blocks can be combined in any appropriate order to carry out the method 700 or an alternative method. Additionally, individual blocks may be deleted from the method 700 without departing from the scope of the subject matter described herein.

The method 700 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 7, the method 700 may be performed by a processing device, such as a processor of the MFD such as the printer 104-1.

At block 702, the MFD 104-1 receives a print job from a user device, say user device 102-2. The print job is received in the form of page description language (PDL) file. The PDL file may include information about various objects, say, characters, words, text, graphics, photos, line, and the like, contained in the input image present in the PDL file. The information may describe the appearance of the objects present within the input image, and may include a set of programming language commands for processing the input image based on the information. In one example, based on the set of programming language commands or specifications present in the PDL file, the input image may be processed.

At block 704, based on the commands and information stored in PDL file, the PDL file is decomposed to determine whether any object, such as text, graphic, or line object, in the input image is selected by the user for image quality enhancement. In case it is determined that the quality enhancement option has been selected for any object, the input image present in the PDL file is converted into a digital bitmap image comprised of an array of pixels. In an example, each pixel comprised in the digital bitmap image is assigned with pixel value representing printing information.

At block 706, based on the pixel value, edge pixels of the object present in the input image are detected.

At block 708, once the edge pixels of the object are detected or defined based on the associated pixel values. Then, enhancement of the edge pixels of the object is performed. In one example, in order to perform enhancement, for each and every detected edge pixel, a window is formed around the edge pixel with a height and a width of predefined pixels. Then, a sum of active pixels in columns and a sum of active pixels in rows are calculated for the window. Based on the calculation, a determination is made for direction of edge of the object present in the window; and a determination is made as to whether the edge pixel is formed due to black-to-white transition or white-to-black transition. Then, based on both determinations, direction and transition determinations, the enhancement is performed on the edge pixel in the window.

At block 710, an output image is generated based on the enhancement performed on the edge pixels of the object.

At block 712, the generated output image is printed at the MFD.

Thus, with the implementation of the present subject, the method 700 described herein can easily detect and enhance the object, such as text, graphic, or line art, present in the input image.

Further, the present subject matter is disclosed herein with reference to a server-client architecture; however, the subject matter is equally applicable to printing systems implemented in multi-functional devices, such as printers, copiers, and the like, which are in direct communication with the user devices.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "merging" or "decomposing" or "extracting" or "modifying" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for enhancing an object present in an input image, the method comprising:
- receiving a print job, wherein the print job comprising the input image;
- converting the input image into a digital bitmap image comprised of an array of pixels, wherein each pixel being assigned with a pixel value representing printing information;
- based on the pixel value, detecting edge pixels of the object present in the input image;
- performing enhancement on the edge pixels of the object present in the input image, wherein for each edge pixel:
- forming a window around the edge pixel with a height and a width of predefined pixels;
- calculating a sum of active pixels in columns and a sum of active pixels in rows for the window;
- based on the calculation, determining direction of edge of the object present in the window, and determining whether the edge pixel is formed due to black-to-white transition or white-to-black transition; and
- based on the determination, performing the enhancement on the edge pixel in the window;
- generating an output image based on the enhancement performed on the edge pixels of the object; and
- printing the generated output image.

2. The method of claim 1, wherein the receiving comprising receiving the print job in a page description language (PDL) file from a user device.

3. The method of claim 1, wherein the converting comprising:
- decomposing the print job using commands and information stored in the print job to extract the input image; and
- performing raster image processing on the input image to convert the input image into the digital bitmap image.

4. The method of claim 1, wherein the forming comprising forming the window around the edge pixel with a height and width of 9 pixels.

5. The method of claim 4, further comprising splitting the window into nine 3×3 kernels.

6. The method of claim 5, further comprising:
- calculating the sum of active pixels in columns of the window;
- determining whether the sum of active pixels in columns is greater than a predefined threshold; and
- performing enhancement in vertical direction when the sum of active pixels in columns is greater than the predefined threshold.

7. The method of claim 6, wherein the predefined threshold is 7.

8. The method of claim 6, wherein the performing enhancement comprising:
- determining a sum of active pixels being assigned with a pixel value greater than 100 in a given 3×3 kernel;
- performing the enhancement from white-to-black transition in the vertical direction when the determined sum of active pixels being assigned with a pixel value greater than 100 is more than 4 active pixels in the given 3×3 kernel; or
- performing the enhancement from black-to-white transition in the vertical direction when the determined sum of active pixels being assigned with a pixel value greater than 100 is more than 4 active pixels in the given 3×3 kernel.

9. The method of claim 5, further comprising:
- calculating the sum of active pixels in rows of the window;
- determining whether the sum of active pixels in rows is greater than a predefined threshold; and
- performing enhancement in horizontal direction when the sum of active pixels in rows is greater than the predefined threshold.

10. The method of claim 9, wherein the predefined threshold is 7.

11. The method of claim 9, wherein the performing enhancement comprising:
- determining a sum of active pixels being assigned with a pixel value greater than 100 in a given 3×3 kernel;
- performing the enhancement from white-to-black transition in the horizontal direction when the determined sum of active pixels being assigned with a pixel value greater than 100 is more than 4 active pixels in the given 3×3 kernel; or
- performing the enhancement from black-to-white transition in the horizontal direction when the determined sum of active pixels being assigned with a pixel value greater than 100 is more than 4 pixels in the given 3×3 kernel.

12. A digital printer for enhancing an object present in an input image, comprising:
- a processor;
- a digital front end (DFE) module, coupled to the processor, to:
- receive a print job at the digital printer, wherein the print job comprising the input image;
- convert the input image into a digital bitmap image comprised of an array of pixels, wherein each pixel being assigned with a pixel value representing printing information;
- based on the pixel value, detect edge pixels of the object present in the input image; and
- perform enhancement on the edge pixels of the object present in the input image, wherein for each edge pixel, the enhancement is being performed by:
- forming a window around the edge pixel with a height and a width of predefined pixels;
- calculating sum of active pixels in columns and sum of active pixels in rows for the window;
- based on the calculation, determining direction of edge of the object present in the window, and determining whether the edge pixel is formed due to black-to-white transition or white-to-black transition; and
- based on the determination, performing the enhancement on the edge pixel in the window; and
- a digital rear end (DRE) module, coupled to the processor, to generate an output image based on the enhancement performed on the edge pixels the object, and to print the output image at the digital printer.

13. The digital printer of claim 12, wherein the DFE module receives the print job in a page description language (PDL) file from a user device.

14. The digital printer of claim 12, wherein the DFE module comprises an image raster processor to:
   decompose the print job using commands and data stored in the print job to extract the input image; and
   perform raster image processing on the input image to convert the input image into the digital bitmap image.

15. The digital printer of claim 14, wherein the image raster processor is to form the window around the edge pixel with a height and width of 9 pixels.

16. The digital printer of claim 14, wherein the image raster processor is to split the window into nine 3×3 kernels.

17. The digital printer of claim 16, wherein the image raster processor is to:
   calculate the sum of active pixels in columns of the window;
   determine whether the sum of active pixels in columns is greater than a predefined threshold; and
   perform enhancement in vertical direction when the sum of active pixels in columns is greater than the predefined threshold.

18. The digital printer of claim 17, wherein the predefined threshold is 7.

19. The digital printer of claim 17, wherein the enhancement is performed by:
   determining a sum of active pixels being assigned a pixel value of greater than 100 in a given 3×3 kernel;
   performing the enhancement from white-to-black transition in the vertical direction when the determined sum of active pixels being assigned a pixel value of greater than 100 is more than 4 active pixels in the given 3×3 kernel; or
   performing the enhancement from black-to-white transition in the vertical direction when the determined sum of active pixels being assigned a pixel value of greater than 100 is more than 4 active pixels in the given 3×3 kernel.

20. The digital printer of claim 16, wherein the image raster processor is to:
   calculate the sum of active pixels in rows of the window;
   determine whether the sum of active pixels in rows is greater than a predefined threshold; and
   perform enhancement in horizontal direction when the sum of active pixels in rows is greater than the predefined threshold.

21. The digital printer of claim 20, wherein the predefined threshold is 7.

22. The digital printer of claim 20, wherein the enhancement is performed by:
   determining a sum of active pixels being assigned a pixel value of greater than 100 in a given 3×3 kernel;
   performing the enhancement from white-to-black transition in the horizontal direction when the determined sum of active pixels being assigned a pixel value of greater than 100 is more than 4 active pixels in the given 3×3 kernel; or
   performing the enhancement from black-to-white transition in the horizontal direction when the determined sum of active pixels being assigned a pixel value of greater than 100 is more than 4 active pixels in the given 3×3 kernel.

23. A non-transitory computer-readable medium comprising instructions executable by a processing resource to:
   receive a print job, wherein the print job comprising an input image;
   convert the input image into a digital bitmap image comprised of an array of pixels, wherein each pixel being assigned with a pixel value representing printing information;
   based on the pixel value, detect edge pixels of the object present in the input image;
   perform enhancement on the edge pixels of the object present in the input image, wherein for each edge pixel, the enhancement is being performed by:
      forming a window around the edge pixel with a height and width of predefined pixels;
      calculating a sum of active pixels in columns and a sum of active pixels in rows for the window;
      based on the calculation, determining direction of edge of the object present in the window, and determining whether the edge pixel is formed due to black-to-white transition or white-to-black transition; and
      based on the determination, performing the enhancement on the edge pixel in the window;
   generate an output image based on the enhancement performed on the edge pixels of the object; and
   print the output image.

24. The non-transitory computer-readable medium of claim 23 comprising instructions executable by the processing resource to receive the print job in a PDL file from a user device.

25. The non-transitory computer-readable medium of claim 23 comprising instructions executable by the processing resource to:
   decompose the print job using commands and data stored in the print job to extract the input image; and
   perform raster image processing on the input image to convert the input image into the digital bitmap image.

26. The non-transitory computer-readable medium of claim 23 comprising instructions executable by the processing resource to form the window around the edge pixel with a height and a width of 9 pixels.

27. The non-transitory computer-readable medium of claim 23 comprising instructions executable by the processing resource to split the window into nine 3×3 kernels.

28. The non-transitory computer-readable medium of claim 27 comprising instructions executable by the processing resource to:
   calculate the sum of active pixels in columns of the window;
   determine whether the sum of active pixels in columns is greater than a predefined threshold; and
   perform enhancement in vertical direction when the sum of active pixels in columns is greater than the predefined threshold.

29. The non-transitory computer-readable medium of claim 28, wherein the predefined threshold is 7.

30. The non-transitory computer-readable medium of claim 28 comprising instructions executable by the processing resource to:
   determine a sum of active pixels being assigned a pixel value of greater than 100 in a given 3×3 kernel;
   perform the enhancement from white-to-black transition in the vertical direction when the determined sum of active pixels being assigned a pixel value of greater than 100 is more than 4 active pixels in the given 3×3 kernel; or
   perform the enhancement from black-to-white transition in the vertical direction when the determined sum of active pixels being assigned a pixel value of greater than 100 is more than 4 active pixels in the given 3×3 kernel.

31. The non-transitory computer-readable medium of claim 27 comprising instructions executable by the processing resource to:
- calculate the sum of active pixels in rows of the window;
- determine whether the sum of active pixels in rows is greater than a predefined threshold;
- perform enhancement in horizontal direction when the sum of active pixels in rows is greater than the predefined threshold.

32. The non-transitory computer-readable medium of claim 31, wherein the predefined threshold is 7.

33. The non-transitory computer-readable medium of claim 31 comprising instructions executable by the processing resource to:
- determine a sum of active pixels being assigned a pixel value of greater than 100 in a given 3×3 kernel;
- perform the enhancement from white-to-black transition in the horizontal direction when the determined sum of active pixels being assigned a pixel value of greater than 100 is more than 4 active pixels in the given 3×3 kernel; or
- perform the enhancement from black-to-white transition in the horizontal direction when the determined sum of active pixels being assigned a pixel value of greater than 100 is more than 4 active pixels in the given 3×3 kernel.

* * * * *